United States Patent
Griffith et al.

[15] 3,636,970
[45] Jan. 25, 1972

[54] FLUID FLOW REGULATOR VALVES

[72] Inventors: Willard Denis Griffith; Harry William Norton, both of Ludlow, England

[73] Assignee: F. W. McConnel Limited, Ludlow, England

[22] Filed: Feb. 17, 1970

[21] Appl. No.: 11,957

[30] Foreign Application Priority Data

Feb. 18, 1969   Great Britain........................8,747/69

[52] U.S. Cl..............................................137/117, 137/495
[51] Int. Cl.........................................................F16k 31/14
[58] Field of Search..................................137/117, 101, 495

[56] References Cited

UNITED STATES PATENTS

| | | | |
|---|---|---|---|
| 3,253,607 | 5/1966 | Drutchas | 137/117 |
| 3,320,968 | 5/1967 | Nuss | 137/117 |

*Primary Examiner*—Robert G. Nilson
*Attorney*—Watson, Cole, Grindle & Watson

[57] ABSTRACT

A fluid flow regulator valve comprises a valve chamber having an inlet communicating with fluid under pressure, a service port communicating with a device operated by fluid pressure, and an outlet communicating with exhaust. In the chamber there is a movable valve member having a spring urging it to close the outlet. A flow-responsive element on the valve member causes a force, dependent on the rate of fluid flow through the chamber to act on the valve member in such a manner as to overcome the spring and move the valve member away from the outlet port when the rate of fluid flow reaches a certain value. The valve member and outlet port are so dimensioned that the pressure of fluid within the valve chamber assists the spring, so that the rate of fluid flow at which the outlet port is opened increases with increase of fluid pressure in the chamber.

11 Claims, 1 Drawing Figure

PATENTED JAN25 1972  3,636,970
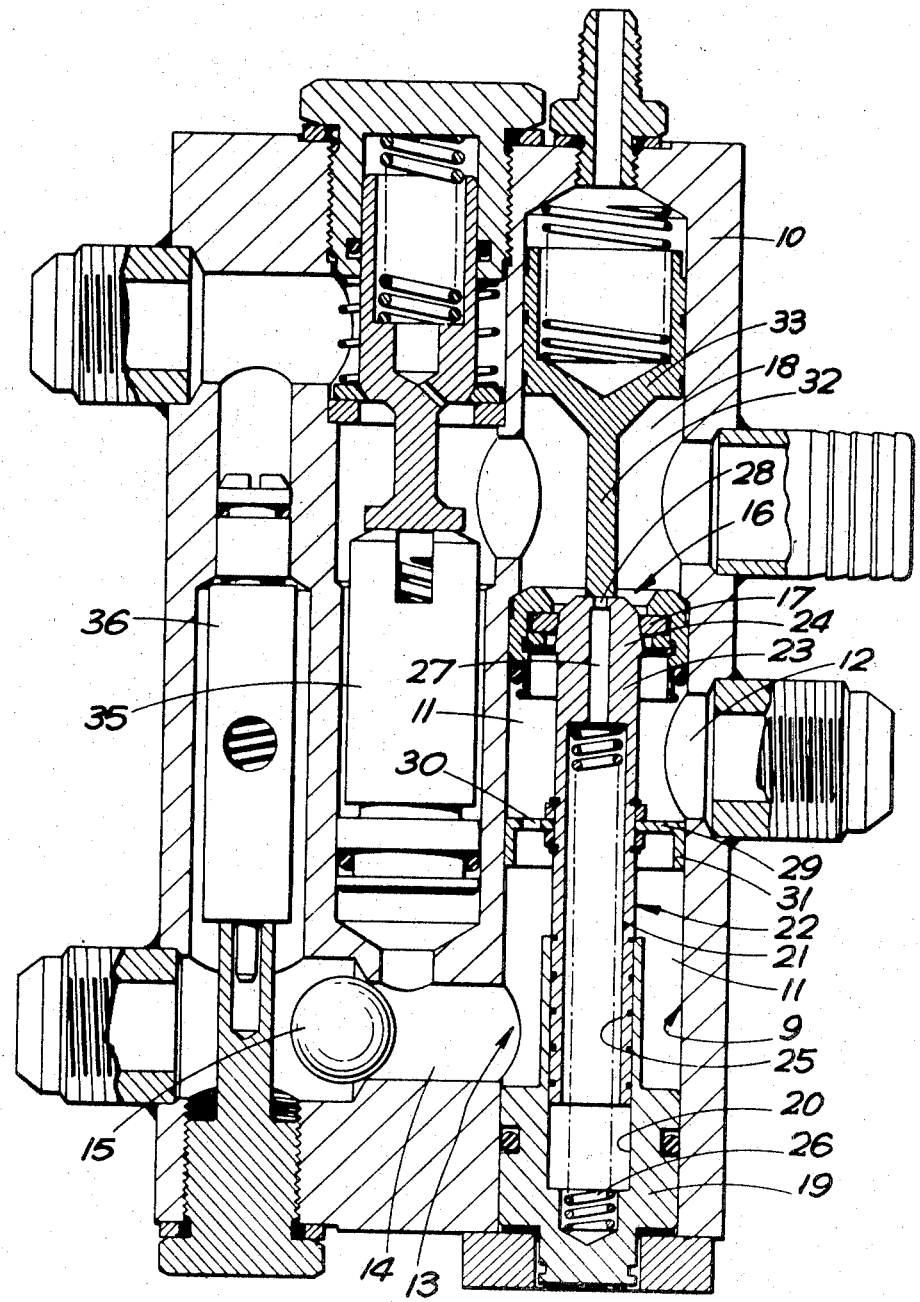

FLUID FLOW REGULATOR VALVES

The invention relates to fluid flow regulator valves of the kind comprising a valve chamber having an inlet port for communication with a source of fluid under pressure, a service port for communication with a device to be operated by the flow of fluid from the source, and an outlet port for communication with exhaust, there being provided a movable valve member having biasing means urging it to close said outlet port, and flow responsive means which causes to be applied to the valve member a force dependent on the rate of fluid flow through the chamber from the inlet port to the service port, the force acting in such manner as to overcome the biasing means, and hence move the valve member away from the outlet port, when the rate of fluid flow reaches a certain value.

In a fluid flow regulator of this kind the flow-responsive means normally comprise one or more orifices in a part of the valve member through which the fluid flows as it passes from the inlet port to the service port. The flow of fluid through the orifices causes a pressure drop which is dependent on the rate of flow, and the arrangement is such that the pressure difference thus created acts in a direction to urge the valve member away from the outlet port. Thus when the rate of flow rises above a predetermined value the pressure difference reaches a magnitude sufficient to overcome the biasing means and the outlet port is opened and a proportion of the fluid is bypassed to exhaust, thus limiting the rate of flow to the service port. The regulator valve therefore acts to maintain substantially constant the rate of flow of fluid to the device.

The device which is driven by the fluid supplied under pressure through the regulator valve may be, for example, the hydraulic motor of a circular saw type hedge trimmer. Such a hedge trimmer is frequently driven from the hydraulic system of a tractor. The flow regulator is necessary since the pump of the tractor hydraulic system may be driven at varying speeds whereas the circular saw requires to be supplied with a constant flow rate of hydraulic fluid. The rate at which fluid is delivered to the motor is required to remain constant in spite of any pressure variations in the system.

However, it is also normal in hydraulic systems that as pressures increase, so losses of fluid increase through the various leak paths in valves and motors. The result of this is that as the load on the hydraulic motor increases, the speed tends to fall, and in the case of a hedge trimmer this drop in speed results in a drop in the cutting efficiency which in turn further increases the cutting loads and leads to rapid stalling.

The present invention sets out to overcome this disadvantage by providing a regulator valve which will respond to a rise in fluid pressure in the system in such a manner as to deliver more fluid to the motor, thereby maintaining the rotary speed under load.

According to the invention there is provided a fluid flow regulator valve of the kind first referred to wherein the movable valve member and outlet port are so dimensioned and arranged that the pressure of fluid in the valve chamber acts on the valve member in a manner to urge it to the position where it closes the outlet port. With such an arrangement an increase in the pressure of the fluid supply causes an increased force urging the valve member to the closed position and there is therefore a corresponding increase in the rate of fluid flow necessary to cause movement of the valve member away from the port.

The movable valve member may comprise a piston part reciprocable within a bore disposed opposite the outlet port in a wall of the valve chamber.

The bore may be a closed bore in communication with a low-pressure zone, the piston part of the valve member being of smaller cross-sectional area than the outlet port, whereby fluid pressure in the valve chamber causes a resultant force urging the valve member towards the outlet port. The communication of the closed bore with a low-pressure zone may be provided by a passage which places the closed bore in communication with exhaust. For example, the passage may be formed in the movable valve member itself, opposite ends of the passage opening into the closed bore and the outlet port respectively.

In any of the above arrangements the biasing means may comprise a spring, for example, a helical compression spring.

The flow-responsive means may comprise an element mounted on the movable valve member and having at least one orifice through which the fluid flows as it passes from the inlet port to the service port, the element being so disposed that the pressure difference between the two sides of the element, caused by the flow of fluid through the orifice, acts in a direction to urge the valve member away from the outlet port.

The element may be an annular element encircling a part of the valve member and slidable within a bore forming part of the valve chamber.

When it is wished to interrupt the drive to the device being driven, the quickest and most convenient way of doing this is to divert substantially all of the supply fluid to exhaust. Hitherto this has been effected by providing an independent operator controlled valve between the fluid supply and the device.

In a fluid flow regulator valve according to the invention, there may be provided operator-controlled means, operation of which is adapted to move the aforesaid valve member away from said outlet port so as to bypass substantially all the fluid from the source to exhaust. For example the means may comprise a reciprocable push rod engageable with the movable valve member through the outlet port. Thus the regulator valve is employed to control the device and an independent controlling valve is not necessary.

The following is a more detailed description of one embodiment of the invention reference being made to the accompanying drawing which is a vertical section through a regulator valve for controlling the supply of hydraulic fluid to the hydraulic motor of a circular saw type hedge trimmer.

The valve comprises a main block 10 formed with a circular cross section bore 9 the lower part 11 of which constitutes the aforementioned valve chamber. An inlet port 12 is in communication with the valve chamber and a supply of hydraulic fluid under pressure, for example provided from a tractor hydraulic system, is connected to the inlet port 12.

A service port 13 leads from the valve chamber 11 to a passage 14 which communicates through a nonreturn valve 15 with a conduit (not shown) leading to the hydraulic motor of the hedge trimmer.

An outlet port 16 surrounded by a valve seat 17 leads from the upper end of the valve chamber 11 and communicates with an upper part 18 of the bore 9 which in turn is in communication with a conduit leading to the hydraulic fluid reservoir on the tractor.

An insert 19 in the main block 10 constitutes the bottom wall of the valve chamber 11 and is formed with a bore 20 which is closed at its lower end. A piston part 21 of a movable valve member 22 is closely slidable within the bore 20 and the upper part 23 of the valve member 22 is formed with an enlarged tapered valve head 24 engageable with the valve seat 17.

The valve member 22 is formed with a central bore 25 and a helical compression spring 26 is disposed between the closed end of the bore 20 and the closed end of the bore 25 so as to bias the valve member upwardly into engagement with the valve seat 17. A narrow bore 27 is formed in the upper end of the valve member 22 and is in communication with the upper part 18 of the bore 9 through a transverse slot 28 which extends completely across the diameter of the upper face of valve head 24.

An annular piston element 29 encircles and is secured to the valve member 22 at the junction between the parts 21 and 23 thereof. The piston element is formed with a number of circumferentially spaced orifices 30 and is formed at its periphery with a skirt 31, which is in close sliding engagement with the wall of the valve chamber 11.

A piston 33 is reciprocable in the bore part 18. Integral with the piston 33 is a vertical push rod 32 the lower end of which is engageable with the valve head 24. The upper end of the bore part 18 is in communication, through a conduit and remote control valve (not shown), with a source of hydraulic fluid under pressure. When the remote control valve is operated the upper end of the bore part 18 is pressurized and the piston 33 is moved downwardly. The push rod 32 thus urges the valve member 22 downwardly bringing the valve head 24 away from the valve seat 17. The ends of the transverse passage 28 extend beyond the sides of the push rod 32 so that when the push rod engages the valve member it does not close the passage 28.

Instead of being mounted on the hydraulically operated piston 33 the push rod 32 may be engaged by a ball which is in turn engaged by a rotating camshaft. The camshaft has a lever mounted thereon so that by swinging the lever the camshaft is rotated and the ball and push rod moved downwardly.

In operation of the device, hydraulic fluid under pressure passes through the port 12 into the valve chamber 11, passes through the orifices 30 and thence through the service port 13 and nonreturn valve 15 to the hydraulic motor of the hedge trimmer. The fluid passing through the orifices 30 produces a pressure difference across the piston element 29 which is dependent on the rate of flow of the fluid. At a predetermined pressure difference, (dependent on the area of the piston element 29 and the strength of the spring 26) the valve member 22 will be moved downwardly, bringing the valve head 24 away from the seat 17 and allowing hydraulic fluid to escape through the outlet 16 to exhaust. It can be seen that by appropriate selection of the spring strength in relation to the orifice size a specified proportion of fluid can be passed to the motor.

Now if the fluid pressure rises in the system due to an increased load on the hydraulic motor, this pressure rise will be transmitted to both sides of the piston element 29 since it is independent of the pressure difference brought about by the flow. In the arrangement shown the cross-sectional area of the part 21 of the valve member 22 is less than the effective cross-sectional area of the outlet port 16. The pressure in the valve chamber 11 therefore gives rise to a resultant upward force on the valve member tending to close the outlet port. This additional force depends on the cross-sectional area ratio of the part 21 and port 16. This upward force adds to the upward force exerted by the spring 26 and consequently as the pressure of the system rises a greater pressure drop across the piston element 29 is necessary to move the valve member 22 downwardly to open the port 16. Consequently a greater rate of fluid flow through the orifices 30 is required before the port 16 is opened and fluid is bypassed to exhaust. It will thus be seen that as the load in the hydraulic motor causes a rise in the pressure of the system, the rate of flow, while still being regulated, rises to compensate for losses in the system.

In order to stop the motor the aforementioned remote control valve is operated and the piston 33 and push rod 32 move the valve member 22 downwardly so that substantially all the fluid under pressure passing through the inlet 12 is bypassed to exhaust through the outlet port 16.

In the arrangement shown the regulator valve is shown in conjunction with other components required to control a hedge trimmer including a system relief valve 35 and a braking valve 36 which is designed to stop the saw positively rather than allowing it to freewheel to rest after "open circuiting" the system by means of the piston 33 and push rod 32.

We claim:
1. A fluid flow regulator valve comprising a valve chamber having an inlet port for communication with a source of fluid under pressure, a service port for communication with a device to be operated by the flow of fluid from the source, and an outlet port for communication with exhaust, there being provided a movable valve member, biasing means urging the valve member in a direction to close said outlet port, and flow-responsive means which causes to be applied to the valve member a force dependent on the rate of fluid flow through the chamber from the inlet port to the service port, the force acting in a direction to oppose the biasing means, and hence move the valve member away from the outlet port, when the rate of fluid flow reaches a certain value, the movable valve member and outlet port being so dimensioned and arranged with respect to one another that the pressure of fluid in the valve chamber acts on the valve member in a manner to urge it to the position where it closes the outlet port.

2. A fluid flow regulator valve according to claim 1 wherein the movable valve member comprises a piston part reciprocable within a bore disposed, opposite the outlet port, in a wall of the valve chamber.

3. A fluid flow regulator valve according to claim 2 wherein the bore is a closed bore in communication with a low-pressure zone, the piston part of the valve member being of smaller cross-sectional area than the outlet port, whereby fluid pressure in the valve chamber causes a resultant force urging the valve member towards the outlet port.

4. A fluid flow regulator valve according to claim 3 wherein communication of the closed bore with a low-pressure zone is provided by a passage which places the closed bore in communication with exhaust.

5. A fluid flow regulator valve according to claim 4 wherein the passage is formed in the movable valve member itself, opposite ends of the passage opening into the closed bore and the outlet port respectively.

6. A fluid flow regulator valve according to claim 1 wherein the biasing means comprise a spring.

7. A fluid flow regulator valve according to claim 6 wherein the spring is a helical compression spring.

8. A fluid flow regulator valve according to claim 1 wherein the flow-responsive means comprise an element mounted on the movable valve member and having at least one orifice through which the fluid flows as it passes from the inlet port to the service port, the element being so disposed that the pressure difference between the two sides of the element, caused by the flow of fluid through the orifice, acts in a direction to urge the valve member away from the outlet port.

9. A fluid flow regulator valve according to claim 8 wherein said element is an annular element encircling a part of the valve member and slidable within a bore forming part of the valve chamber.

10. A fluid flow regulator valve according to claim 1 wherein there are provided operator-controlled means, operation of which is adapted to move the aforesaid valve member away from said outlet port so as to bypass substantially all the fluid from the source to exhaust.

11. A fluid flow regulator valve according to claim 10 wherein the operator-controlled means comprise a reciprocable push rod engageable with the movable valve member through the outlet port.

* * * * *